G. C. Howard,
Tool Handle.
№ 17,837.    Patented July 21, 1857.
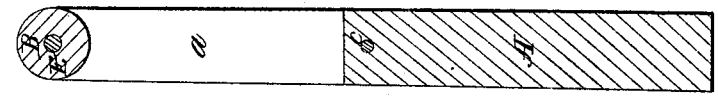
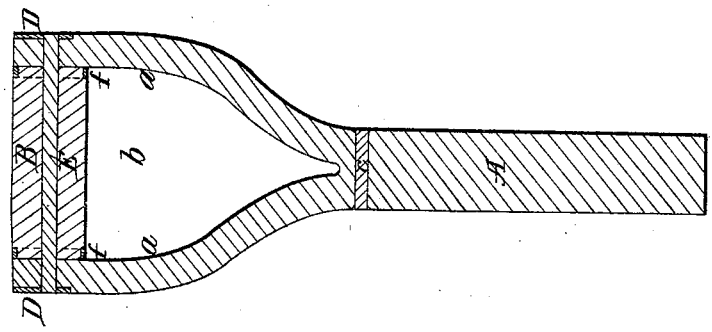
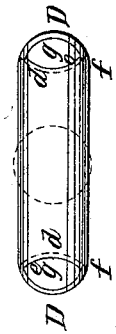
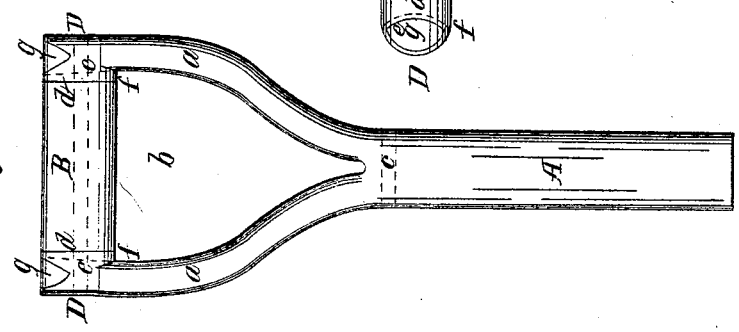
AM. PHOTO-LITHO. CO. N.Y. (OSBORNE'S PROCESS)

UNITED STATES PATENT OFFICE.

GEORGE C. HOWARD, OF HARDWICK, MASSACHUSETTS.

SHOVEL, SPADE, OR DUNG-FORK HANDLE.

Specification forming part of Letters Patent No. 17,837, dated July 21, 1857; Reissued October 22, 1861, No. 1,230.

*To all whom it may concern:*

Be it known that I, GEORGE C. HOWARD, of Hardwick, in the county of Worcester and State of Massachusetts, have invented an Improved Manufacture of Shovel, Spade, or Dung-Fork Handles; and I do hereby declare that the same is fully described and represented in the following specification and the accompanying drawings, of which—

Figure 1 is a side view of my said handle. Fig. 2, a top view of it; Fig. 3, a longitudinal section taken through both of the arms of the eye; Fig. 4, a transverse section taken in line with the axis of the holder.

In carrying out my invention I first take a bar of wood used in making shovel handles and saw or split into it about six inches in depth and afterward steam the bar, and bend the part that is split so as to impart to it the forked shape as shown at $a$, $a$, in the drawings, the parts $a$, $a$, being the arms of the fork of which the space $b$, between them may be considered as the eye. In order to prevent the bar A, from splitting further during the operation of bending the arms, it may have a rivet $c$, passed through and fixed into it, previous to the bending operation, such rivet being arranged as shown in Fig. 3. These forked arms are next to be applied to a holder B, by the following means, that is, each end of the holder is to be formed with a concave or angular recess $d$, to receive a corresponding convex or angular projection $e$ made on the inner end of the adjacent arm $a$. The whole is next to be screwed together by metallic caps D, D, and a rod E, extending through the holder, the arms and the caps, and riveted down upon the latter. These caps are formed so as to extend partially and horizontally around the arms and in the drawings each of them is shown as united to a metallic annulus $f$, which receives the end of the holder and prevents it from becoming split or cracked open. The annulus is also made with a concavity or recess $g$, both above and below the cap and for the reception of the convexity of the arm, this serving as an addition to the bearing for the arm, while the ring and cap so embrace the arm as to prevent it from being split by the riveted rod.

This mode of making a shovel or spade handle is far preferable to that where the whole handle and eye or head are cut from one piece of board equal in width to the width of the head of the handle. By my method of making the handle, such a piece of wood would make some three or four handles and therefore, that which would be otherwise wasted by the old plan of making the handle is saved by my method. Besides this my improved handle is more durable and stronger than one of the old kind.

What therefore I claim is—

My improved manufacture of shovel handle, as made with a split and bent stock, and a round holder applied and fixed together by concavities in the ends of the holder, convexities on the arms of the eye, and a rod and metallic caps arranged and fixed together as specified.

In testimony whereof I have hereunto set my signature.

GEORGE C. HOWARD.

Witnesses:
WILLIAM MIXTER,
JOSEPH H. KNOX.

[FIRST PRINTED 1912.]